United States Patent
Halonen

(10) Patent No.: US 6,389,264 B1
(45) Date of Patent: May 14, 2002

(54) DISTANCE MEASUREMENT SYSTEM FOR TIMING ADVANCE CONTROLLED SYSTEMS

(75) Inventor: Harri H. Halonen, Jääli (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/252,602

(22) Filed: Feb. 17, 1999

(51) Int. Cl.⁷ .............................. H04B 17/00
(52) U.S. Cl. ............... 455/67.1; 455/456; 455/423; 455/226.2; 370/335; 375/130
(58) Field of Search ................. 455/456, 457, 455/67.1, 423–425, 436, 67.6, 68–69, 226.1, 226.2, 226.3, 230, 561; 370/337, 331, 335

(56) References Cited

U.S. PATENT DOCUMENTS

| | | | | |
|---|---|---|---|---|
| 5,327,575 A | * | 7/1994 | Menich et al. ............... | 455/437 |
| 5,640,396 A | * | 6/1997 | Cudak et al. ................ | 370/337 |
| 5,670,964 A | * | 9/1997 | Dent .......................... | 342/457 |
| 5,678,185 A | * | 10/1997 | Chia .......................... | 455/437 |
| 5,809,424 A | * | 9/1998 | Eizenhoefer ................. | 455/456 |
| 5,831,974 A | * | 11/1998 | Suonvieri .................... | 370/252 |
| 5,839,071 A | * | 11/1998 | Johnson ....................... | 455/440 |
| 6,094,421 A | * | 7/2000 | Scott .......................... | 370/280 |

\* cited by examiner

*Primary Examiner*—Tracy Legree
*Assistant Examiner*—Charles Craver
(74) *Attorney, Agent, or Firm*—Robert C. Rolnik

(57) ABSTRACT

A system is disclosed to operate within a multiple access system having remote devices that are located at varying distances from a central device using timing advance commands. The invention relates to inserting varying units of delay in the signal path from remote device to central device, wherein the units of delay are a fraction of the smallest timing advance duration. By scanning through the units of delay, thus triggering a timing advance command, the invention infers the distance of the remote device signal path more accurately than would be obtained by relying on timing advance settings alone. Several levels of resolution can be used to scan successively narrower regions.

6 Claims, 2 Drawing Sheets

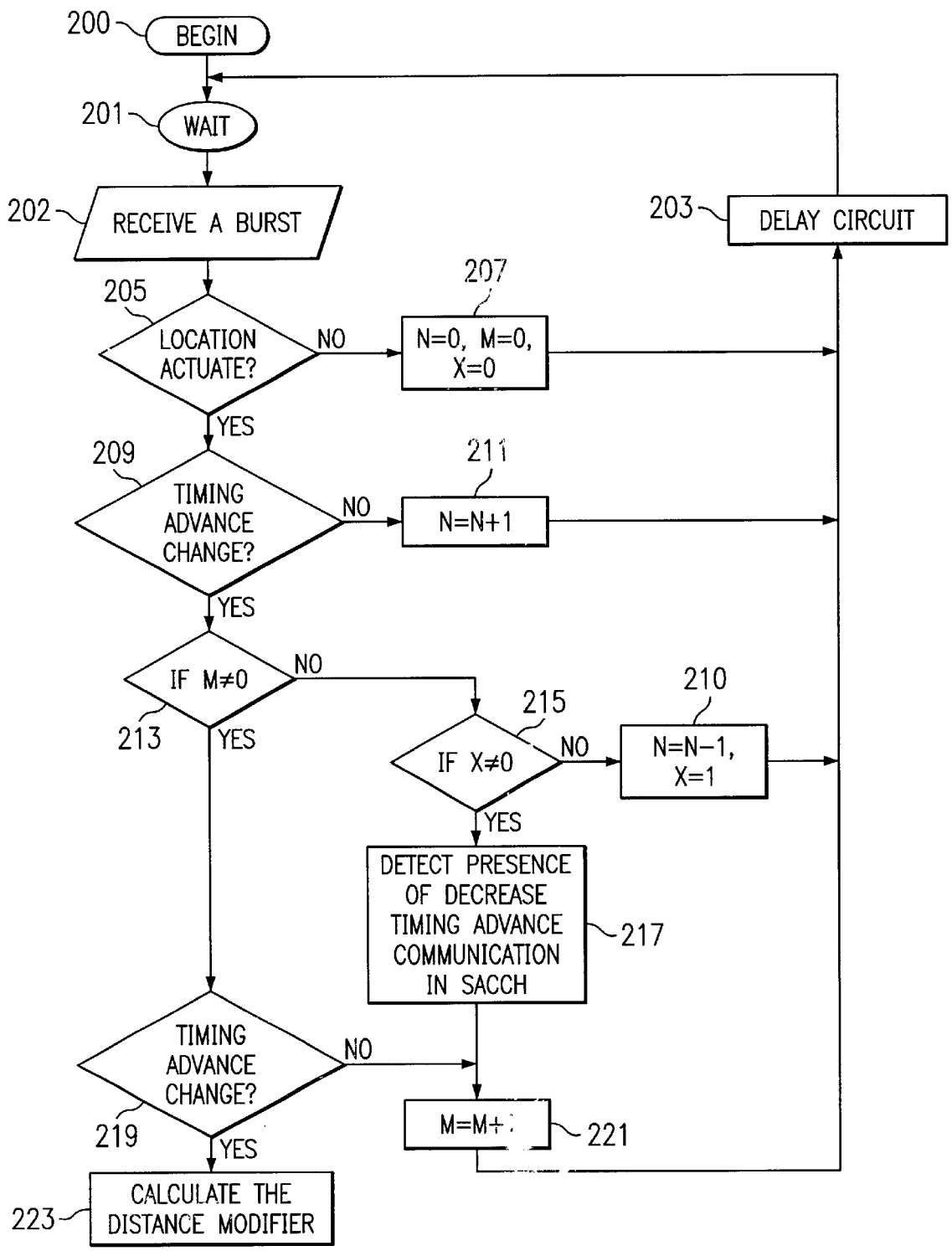

DISTANCE MEASUREMENT SYSTEM FOR TIMING ADVANCE CONTROLLED SYSTEMS

FIELD OF THE INVENTION

This invention relates to a method and apparatus for determining the distance of a mobile wireless device ("mobile") from a base station in a timing advance controlled system.

DESCRIPTION OF THE RELATED ART

Systems of remote devices, e.g., mobiles that communicate with a central device over a common channel in a TDMA fashion, commonly rely on setting a timing advance (TA) for each of the remote devices. The timing advance scheme is necessary to better utilize the several timeslots at which each mobile transmits, i.e., to assure that the remote transmitted packet is received neither too early nor too late at the central device. The TA allows the remote devices to move about in relation to the central device and causes those devices that are farthest to transmit with minimal or no delay, while those that are closest transmit with the maximal delay, avoiding overlap of the received transmissions at the central device.

For example, in a Global System for Mobiles (GSM) system, the specification (see ETSI/TC SMG Recommendation GSM 5.10 V.3.5.1 published October 1992) allows for mobiles to transmit from a distance of 35 km (which would have a timing advance setting of 63 units or bits). The nearest mobile station operates with an advance setting of zero units. The central device or base transceiver station (BTS) and mobiles communicating with it are time synchronized. Absent the use of the timing advance, the packet sent by mobiles near the BTS has the risk of overlapping any uplink packets from the cell fringe by 63 units of delay, where the mobile at the cell fringe transmits in the timeslot immediately prior to the near mobile transmission.

The best accuracy that can be obtained for distance is entirely dependent on the size of the unit of the timing advance. The distance radio waves propagate in the 3.71 microsecond bit duration is 1100 m. Since the timing advance indicates the delay to be used after a reference signal of the BTS is received at a mobile, the actual distance between changes in the TA for the mobile is 1100 m/2, or 550 m, which accounts for half the delay in the roundtrip.

OBJECTS OF THE INVENTION

It is an object of the present invention to provide a manner to successively approximate the distance of a mobile more accurately than that provided by prior art timing advance settings.

It is an object of the present invention to provide a method to use existing timing advance systems and interpose a programmable delay to accelerate the occurrence of a timing advance command.

It is an object of the present invention to provide a method to determine the distance of a mobile that causes minimal bit overlaps of the tested mobile packets and other packets of mobiles operating under timing advance control with the BTS.

SUMMARY OF THE INVENTION

To overcome the limitations in the prior art described above and to overcome other limitations of the prior art that will become apparent upon reading and understanding the present specification, the present invention discloses a method to determine a distance modifier between a mobile transmitter and a central transceiver in a timing advance controlled system having a timing advance including determining if a timing advance changes, and provided it does not, adding progressively larger delays to delay signals of the mobile received at the transceiver. When the timing advance changes, the distance modifier of the mobile based on the size of the last delay is calculated.

In an embodiment of the invention, the method and apparatus is implemented in a time division multiple access (TDMA) system that has a timing advance feature for synchronizing the transmissions of mobile stations to a base station. The timing advance allows the base station to command the mobile station to delay or advance a transmission in time one or more timing advance delay periods (TA) for synchronization purposes. According to the embodiment, the base station also has capability to adjust a received signal (burst) in increments that are less than the TA period to effect an artificial delay, for processing after the burst is received.

The process performed in the embodiment according to the method and apparatus is active and available in the base station when the base station is powered up. When it is desired to determine the distance of the mobile station from the base station, for example, as part of a 911 call mobile location function, a step delay, which is less than the TA, is added to a burst received from the mobile station. The burst having the step delay added is then processed. In the processing, a determination is made as to whether or not the addition of the step delay causes a TA change criteria to be satisfied for the mobile station i.e., whether actual delay of the amount added by the step delay would cause the base station to command the mobile to perform a timing advance change. If the TA change criteria are satisfied, a second processing stage is begun. If the timing advance change criteria for the mobile station are not satisfied for the first processed burst, the step delay is successively and cumulatively added to subsequent received bursts transmitted by the mobile station until the TA change criteria are satisfied. When the TA change criteria are satisfied, the second processing stage is begun.

In the second processing stage of the embodiment, subsequently received bursts from the mobile station are delayed by a base delay equal to the total number of first step delays needed to cause the TA criteria to be satisfied minus one first step delay. This base delay is then cumulatively adjusted by a second step delay for subsequent bursts received from the mobile. The second step delay is smaller than the first step delay. Each burst is processed and a determination is made as to whether the TA change criteria are satisfied after a second step delay adjustment. The second stage processing is repeated until the TA change criteria are not satisfied. When it is determined that the TA change criteria are not satisfied, the distance of the mobile from the base station may be calculated. The distance is calculated using the TA delay period, the number of first step delays needed minus one, and the number of second step delays used in the second stage processing. This gives an accuracy dependent on the size of the second step delay, which is more accurate than the accuracy obtainable from using TA delay alone.

Other embodiments of a system in accordance with the principles of the invention may include alternative or optional additional aspects.

BRIEF DESCRIPTION OF THE DRAWINGS

FIG. 2 is a flow diagram of the steps in delay adjustment loops according to an embodiment of the present invention.

DETAILED DESCRIPTION OF THE INVENTION

In the GSM system, the writers of the GSM specification recognized that rarely do the normal bursts (the main data carrying bursts in a GSM system) get transmitted from the ideal N*550 m distances from the BTS, where N is an integer in value up to the highest number of timing advances used. As a result, the edges of consecutive normal bursts can vary in a range of 3.71 microseconds closer or farther together. Thus, the GSM specification provides some slack to allow for this and the effects of multipath reception, which tends to put energy a little before and after each bit boundary. Without the slack, a normal burst that arrives at the BTS too early will overlap some of the bits of the burst that arrived at the BTS beforehand. This slack takes the form of guard periods of a little more than two-bit periods at the beginning of the normal burst. There is enough slack in the system to allow for even more variance (than 3.71) in arrivals of bursts at the BTS (made by different mobiles), though because the mobile transmitter is ramping up or ramping down power during this time, some attenuated energy of one burst might appear during the burst of another mobile.

Figure 1:
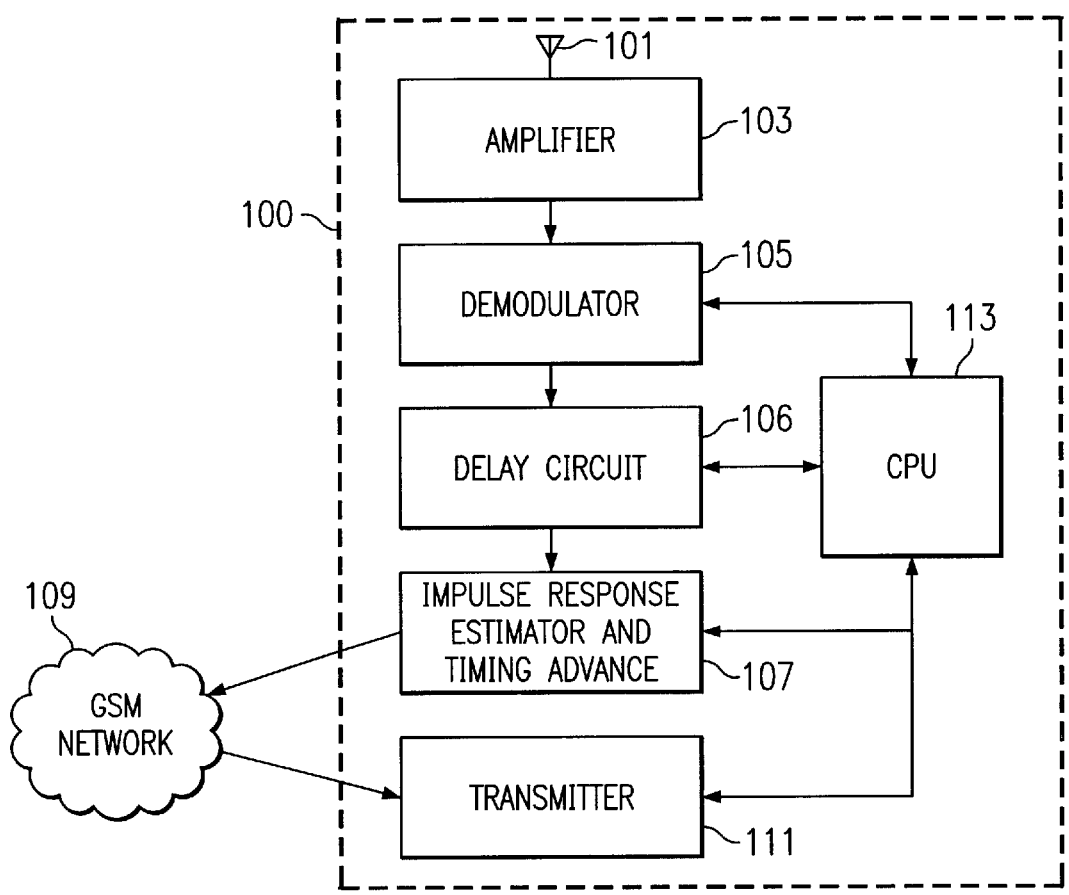
FIG. 1 is a block diagram of a base transceiver station according to an embodiment of the invention.

FIG. 1 shows the BTS 100 according to an embodiment of this invention. It comprises at least an antenna 101 that receives signals, amplifier 103 and a demodulator 105 to convert the signals to a digital form. The digital form is delayed by delay circuit 106 according to the embodiment of the invention, and then handled by digital signal processors (DSPs) to extract estimations from impulse response estimator and timing advance estimator 107. If the timing advance estimation shows that more of the signal of the mobile is being received too early, a decrease in the timing advance is required. The command to the mobile to adjust its timing advance is created by the GSM network 109 which forms a Slow Associated Control Channel (SACCH) message, and more importantly, the part of the SACCH message that commands the mobile to adjust the TA. The GSM network may comprise a CPU that is remotely located to the BTS. The GSM specifications require a SACCH to be transmitted by the BTS on the 26th burst of 26 bursts sent from the BTS to a mobile. The SACCH message is transmitted by transmitter 111 in the frequency and timeslot that the mobile listens to for making adjustments to its timing advance. In addition, CPU 113 controls the demodulator 105, delay circuit 106, impulse response estimator and timing advance estimator 107 and transmitter 111, as well as interacting with GSM network 109.

FIG. 2 is a flow diagram of the steps in delay adjustment loops according to an embodiment of the invention. The delay or substep must be of shorter duration than the TA units of increment (a bit). As an example, a one-quarter bit stepsize to the delay can be implemented. Such delays, on the order of 1 microsecond, can be implemented in a DSP on demodulated samples using techniques known in the art.

The process starts at begin 200. Each execution of the loops of the process must pause at wait 201, while the BTS waits to receive a burst 202. The burst is comprised of demodulated samples, which originate from demodulator 105 of FIG. 1. The point of adding a delay at the BTS is to influence the operation of the setting of the TA in the SACCH that occurs in the GSM network 109. For this reason, the delay is activated on all bursts received from the mobile that are used to calculate the TA in a SACCH. Consequently, one or more of the bursts prior to the time the BTS sends the SACCH will be delayed this way by the invention. The delay introduced delay circuit 203 is measured in whole units of time called stepsize, otherwise shown as "N." N counts out the number of stepsizes to use, which for the embodiment shown is ¼ of a bit period. The smaller the stepsize, the better the accuracy of the invention. The ordinary setting of the control loop (that measures the stepsize in low-resolution units of time, e.g. ¼ of a bit period) occurs in locate actuate step 205. Provided an accurate estimation of location is not needed, the "no" branch of the loop is taken, and the stepsize is initialized at step 207 to zero. In this example, there are two stepsizes, N and M, with M being the smaller in the sense that the counter M is weighted less in the delay circuit. The delay circuit 203 calculates the delay as:

Delay=(Bit Duration)*(N/4+M/16)

Provided an accurate estimation of location is needed, the "yes" branch of the loop is taken at step 205. A potential trigger for estimating location may be an event, such as a 911 call, which the network can detect by examining the call class information associated with the call. When the "yes" branch is taken, the BTS or other central device determines whether timing advance change criteria indicate a timing advance change at step 209, to sense, in this case, if the TA setting in the SACCH message has been configured to increase the timer advance. A determination is made at step 209 if a SACCH has been configured to the mobile station, and operation of the loop is halted until a new SACCH is configured, i.e., the steps of the loop occur once for each SACCH. If the answer for the timing advance change criteria determined at step 209 is "no," a stepsize is added to the delay at step 211 (1 in the example).

Regardless of whether the process is initialized at initialize step 207 or the delay is incremented at add step 211, the resulting delay stepsizes are input to the programmable delay circuit at step 203. Eventually, enough delay is accumulated in the programmable delay circuit 203 to trigger a positive determination at timing advance change criteria at step 209. This occurs when the TA increases, as the GSM network 109 indicates with SACCH messages as input to the invention. Upon this occurrence, the "yes" branch is taken at step 209, and a transition between loops occurs, so that the last stepsize of delay can be removed. The evaluations performed are:

test to see if the next level of delay resolution has been accumulated (or if M is not equal to zero) at step 213, and if "no," then test to see if the last stepsize of delay has been removed at step 215; if a "no" indication, then remove the last stepsize of delay, for example, by subtracting stepsize from N at step 210.

If the last stepsize of delay has been removed (a "yes" answer at step 215), proceed to detect the presence of a "decrease TA" command in the SACCH message at step 217. When the decrease TA command is detected (a TA change criteria), the higher-resolution loop is initialized and the add function at step 221 operates to increment delay.

The occurrence of the TA increase can be read by a CPU in the BTS from the SACCH message. One way to do this is to use the bit pattern for TA in the last SACCH message and perform an XOR with the new SACCH TA bits, wherein a change would be evident any time the operation is greater than zero. The higher-resolution loop, which measures stepsize in smaller, higher resolution units, is taken when M is determined not to be equal to zero generating a "yes" value at step 213. As with the earlier loop, the timing advance change criteria determination at step 219 senses if the TA setting in the SACCH has been increased. If the answer is "no," a stepsize is added to the delay at step 221 (now set to $\frac{1}{16}$ of a bit period) to delay.

The resulting delay is input to the programmable delay circuit at step 203. The timing advance change criteria determined at step 219 are used to determine when to exit the loop. When the change criteria are met, the distance may be more accurately determined. In FIG. 2, the change criteria occur when the TA is increased during the addition of the smaller stepsizes of M to the delay. In the embodiment shown, the loops were executed by using integer arithmetic to increment the delay in large steps using a first stepsize counter N and scaling the result in the final calculation 223 and in the programmable delay circuit 203. Similar integer arithmetic occurs within the second loop using a second stepsize counter of M. In effect, the stepsize is $\frac{1}{4}$*bit duration in the first loop using N, and $\frac{1}{16}$*bit duration in the second loop using M. Using stepsize counters to mark out the stepsize yields an equation for a distance estimate:

$$\text{Distance Estimate} = (\text{Bit Duration}) * (TA + \frac{1}{2} - N/4 - M/16) * C/2$$

with an error $< +M/16*C*(\text{Bit Duration})/2$, where C is the speed of light, and TA is the timing advance setting at the start of the algorithm, and the TA is zero for locations inside the radius (or radio path distance) to the BTS located transceiver of 550 m. This compares favorably to an error using just a TA alone of less than $+TA*C*(\text{Bit Duration})/2$, i.e., it is necessary to add distance to the estimate to obtain the accurate distance. Looking at it a different way, a distance modifier can be obtained equal to $$\text{Distance Modifier} = (\text{Bit duration}) * (N/4 + M/16) * C/2$$

which is subtracted from a prior art estimate of $$(\text{Bit duration}) * (TA + \frac{1}{2}) * C/2$$

to get a more accurate result.

An optional step may be performed after making the distant estimate available. The step is to reset the variable tested by the step locate actuate 205, such that the test results in taking the "no" branch, and all operative variables are set to zero. The result is that the delay circuit 203 operates with zero delay.

Figure 3:
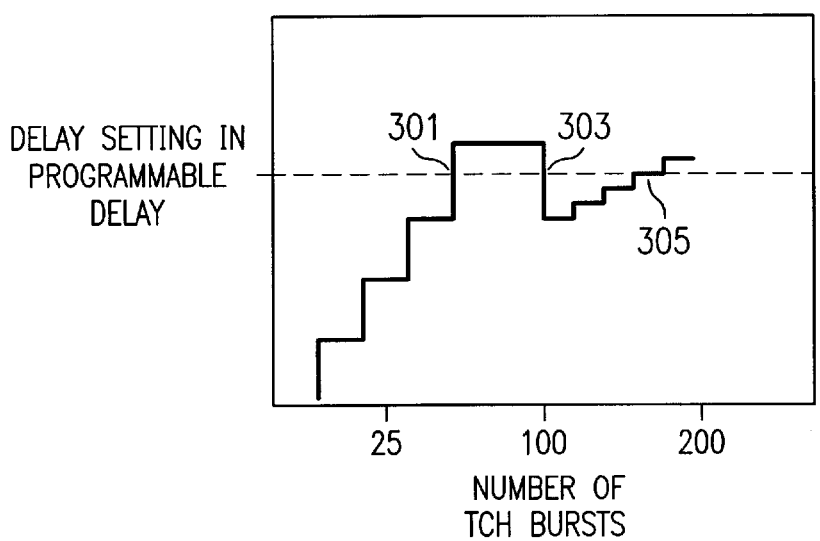
FIG. 3 is a graph of the changing delay duration that occurs in a worst-case example according to an embodiment of the present invention.

FIG. 3 illustrates the longest period to sense accurate distance of this invention, wherein each loop of adding delay N and delay M is executed the most times, as would occur if a mobile is just beyond the distance required to trigger a TA change, and a delay almost as large as a TA has to be introduced to cause another TA change. In this case, reading SACCHs to detect if timing advance change criteria are met, it will take 9 SACCHs to get the new accurate distance. Low-resolution loop exit condition occurs at point 301 occurs when the threshold for a TA change is met (dashed line) and the BTS issues a TA increase command. A BTS then issues a TA decrease command at point 303 as the transition from low-resolution loop occurs, and the high-resolution loop is initialized. A series of four SACCHs (under worst-case conditions) must be read before the exit condition for the high-resolution loop occurs at point 305, which shows a TA increase command.

Some GSM systems may permit a system operator to adjust the accuracy and/or CPU time devoted to TA calculations. One way to do this is to allow fewer than all the mobile bursts since the last SACCH to influence the new TA setting. If that is the situation, the programmable delay added at step 203 is modified to be active only during those mobile bursts that are sensed by the GSM network 109 for changes in propagation delay, which could be accomplished using the formula: make programmable delay active when burst number modulo 26 is equal to or greater than X, wherein X is the first of the bursts (numbered 0 to 25) that is actively used by the GSM network for TA calculations, and SACCH bursts are sent following burst number 25.

The invention disclosed herein has been largely by way of example. A number of multiple access systems that employ commands similar to the SACCH to adjust timing advances or delays may also be used to provide inputs to this invention, and operate with a delay prior to impulse response estimation. In addition, though only two loops are shown, it is understood that more loops may be established in the process for greater levels of accuracy, and that the number of loops (counted by a loopcount variable) to be executed may be variable according to the availability of resources and time.

Although the invention has been described in the context of particular embodiments, it will be realized that a number of modifications to these teachings may occur to one skilled in the art. Thus, while the invention has been particularly shown and described with respect to specific embodiments thereof, it will be understood by those skilled in the art that changes in form and configuration may be made therein without departing from the scope and spirit of the invention.

What is claimed is:

1. A method to estimate the distance of a mobile to a transceiver in a timing advanced controlled system having a timing advance, said method comprising the steps of:
   (a) determining if timing advance change criteria are satisfied when a signal from the mobile is delayed by a delay at the transceiver;
   (b) adding a first stepsize to said delay if the timing advance change criteria are not satisfied, the first stepsize having a time period less than that of the timing advance, and repeating steps (a) and (b) with said delay used in step (a) increasing, as last incremented in step (b), until said timing advance change criteria are determined to be satisfied;
   (c) subtracting, in response to a determination that said timing advance change criteria are satisfied, the first stepsize from said delay and adding a second stepsize to said delay and adding a second stepsize to said delay;
   (d) determining if said timing advance change criteria are satisfied when a signal from the mobile is delayed by said delay at the transceiver;
   (e) adding a second stepsize to said delay if the timing advance change criteria are not satisfied, the second stepsize having a time period less than that of the first stepsize, and repeating steps (d) and (e) with said delay used in step (d) increasing, as last incremented in step (e), until a determination in step (d) that said timing advance change criteria are satisfied; and
   (f) calculating, in response to a determination in step (d) that said timing advance change criteria are satisfied, the distance based on said delay as last incremented in step (e).

2. The method of claim 1 wherein the step (f) is followed by step:
   (g) setting said delay to zero.

3. A method to estimate a distance modifier of a mobile to a transceiver in a timing advance controlled system having a timing advance, said method comprising the steps of:

(a) initializing a loopcount;

(b) determining if timing advance change criteria are satisfied when a signal from the mobile is delayed by a delay at the transceiver;

(c) adding a first stepsize to said delay if the timing advance change criteria are not satisfied, the first stepsize having a time period less than the timing advance;

(d) incrementing said loopcount;

(e) repeating steps (b) and (c) with said delay used in step (b) as last incremented in step (c), until said timing advance change criteria are satisfied;

(f) subtracting the first stepsize from said delay;

(g) initializing the loopcount;

(h) determining if timing advance change criteria are satisfied when a signal from the mobile is delayed by said delay at the transceiver;

(i) adding a second stepsize to said delay if the timing advance change criteria are not satisfied;

(j) incrementing said loopcount;

(k) repeating steps (h) and (i) with said delay used in (h), as last incremented in step (i) until said timing advance criteria are satisfied; and (l) outputting a distance modifier based on said loopcount.

4. The method of claim 3, wherein step (l) is followed by step:

(m) setting said delay to zero.

5. A method to estimate the distance of a mobile station to a base station in a telecommunications system having a timing advance, said method comprising the steps of:

selectively increasing delay of at least one signal received from the mobile station by increments less than said timing advance, wherein selectively increasing comprises:

successively incrementing a first time period by a first time step and delaying one of a first plurality of receiving burst by said first time period each time said first time period is incremented;

determining that a change of value in said timing advance has been necessitated by said step of successively incrementing;

subtracting said first time step from said first time period as last incremented before determining that a change of value in timing advance is necessary in said step of determining that a change of value is necessary;

successively incrementing a second time period by a second time step and delaying one of a second plurality of received bursts by said second time period each time said second time period is incremented;

determining that a change of value in said timing advance has been necessitated by said step of successively incrementing a second time period; and determining, in response to a determination that a change of value in said timing advance has been necessitated, the distance of the mobile station to the base station based on the values of said first and second time periods.

6. An apparatus for determining the distance of a mobile station to a base station in a telecommunications system having a timing advance, said apparatus comprising:

means for selectively increasing delay of at least one signal received from the mobile station by increments less than said timing advance comprising:

means for successively incrementing a first time period by a first time step and means for delaying one of a plurality of receiving bursts by said first time period each time said first time period is incremented;

means for determining that a change of value is necessitated in said timing advance by said means for selectively increasing said first time delay, comprising:

means for subtracting said first time step from said first time period as last incremented by said means for selectively increasing said first time period by a first time step to generate a second time period;

means for successively incrementing said second time period by a second time step and means for delaying one of a second plurality of received burst by said second time period each time said second time period is incremented;

means for determining a change of value is necessitated in said timing advance by said means for successively incrementing said second time period;

means for determining, in response to a determination in said second means for determining a change of value is necessitated, the distance of the mobile station to the base station based on the values of said second time period; and means for determining the distance of the mobile station to the base station based at least on the amount of increase added to said first time delay in said means for selectively increasing.

* * * * *